US012024822B2

(12) United States Patent
Lööf

(10) Patent No.: US 12,024,822 B2
(45) Date of Patent: Jul. 2, 2024

(54) TORQUE REACTION ARRANGEMENT FOR PULP WASHERS

(71) Applicant: VALMET AB, Sundsvall (SE)

(72) Inventor: Tobias Lööf, Söråker (SE)

(73) Assignee: VALMET AB, Sundsvall (SE)

( * ) Notice: Subject to any disclaimer, the term of this patent is extended or adjusted under 35 U.S.C. 154(b) by 273 days.

(21) Appl. No.: 17/621,359

(22) PCT Filed: Jun. 16, 2020

(86) PCT No.: PCT/SE2020/050625
§ 371 (c)(1),
(2) Date: Dec. 21, 2021

(87) PCT Pub. No.: WO2020/263160
PCT Pub. Date: Dec. 30, 2020

(65) Prior Publication Data

US 2022/0356644 A1 Nov. 10, 2022

(30) Foreign Application Priority Data

Jun. 25, 2019 (SE) .................................... 1950778-9

(51) Int. Cl.
*D21C 9/02* (2006.01)
*B30B 9/20* (2006.01)
*B30B 15/28* (2006.01)
*D21C 9/18* (2006.01)

(52) U.S. Cl.
CPC .................. *D21C 9/02* (2013.01); *B30B 9/20* (2013.01); *B30B 15/28* (2013.01); *D21C 9/18* (2013.01)

(58) Field of Classification Search
CPC .... D21C 9/02; D21C 9/18; D21C 9/06; B30B 9/20; B30B 15/28; B01D 33/067; B02C 4/426
USPC .......................................................... 162/232
See application file for complete search history.

(56) References Cited

U.S. PATENT DOCUMENTS

| | | | | |
|---|---|---|---|---|
| 3,980,518 | A | 9/1976 | Ljung et al. | |
| 5,779,126 | A * | 7/1998 | Chun | B02C 4/426 226/183 |
| 2018/0243746 | A1* | 8/2018 | Udy | B30B 3/04 |

FOREIGN PATENT DOCUMENTS

| | | | | |
|---|---|---|---|---|
| DE | 19619110 | A1 | 11/1997 | |
| WO | WO2009/075645 | A1 | 6/2009 | |
| WO | WO-2009075645 | A1 * | 6/2009 | D21C 9/02 |

* cited by examiner

*Primary Examiner* — Jacob T Minskey
*Assistant Examiner* — Matthew M Eslami
(74) *Attorney, Agent, or Firm* — Foley & Lardner LLP

(57) ABSTRACT

A torque reaction arrangement (50) for twin press-roll pulp washers comprises a first torque reaction arm (10), a second torque reaction arm (20), a first link (19), and a second link (29). The links are provided between the ends of a respective torque reaction arm and a point close to the mounting to a respective stator of the other torque reaction arm. The torque reaction arms are rigidly mounted to a respective stator of a respective press roll motor. A twin press-roll pulp washer with such a torque reaction arrangement is also disclosed.

12 Claims, 3 Drawing Sheets

Fig. 1
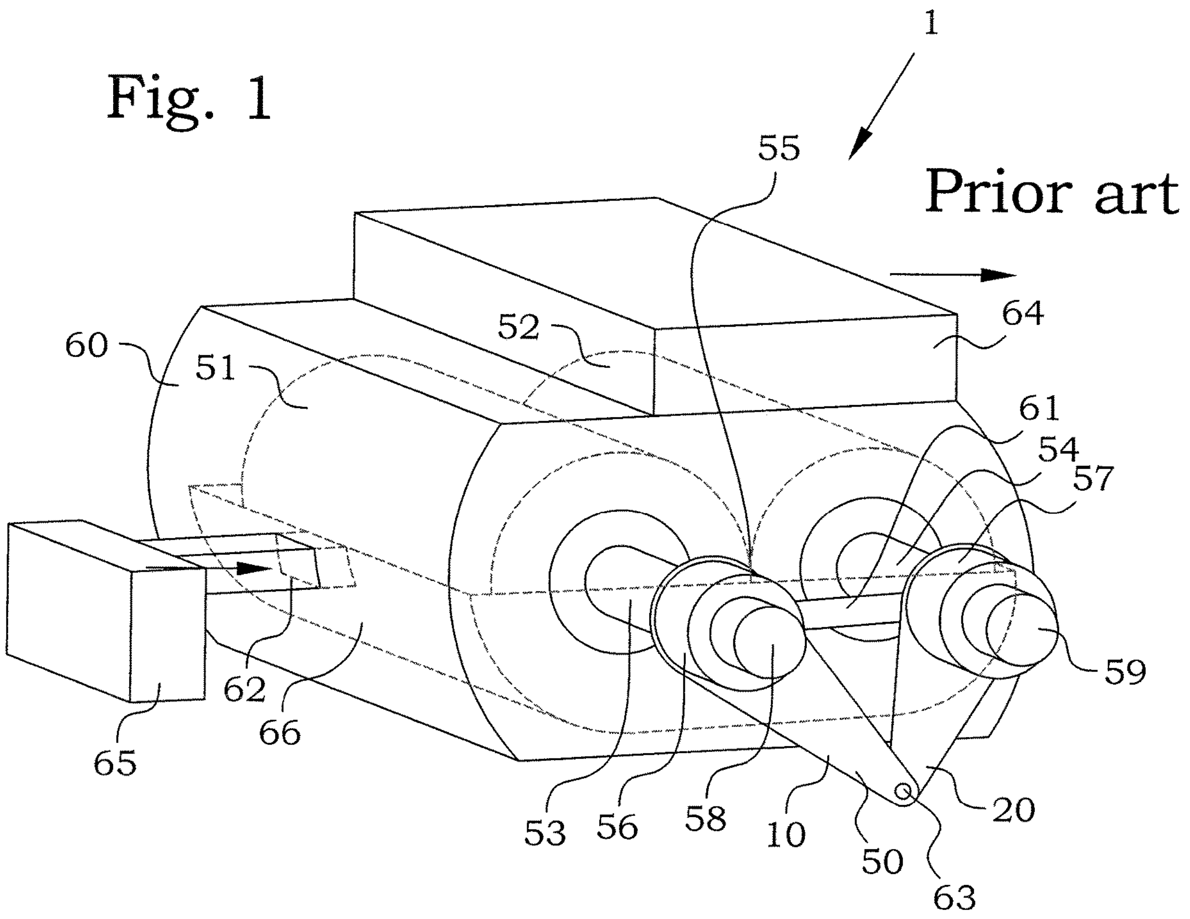
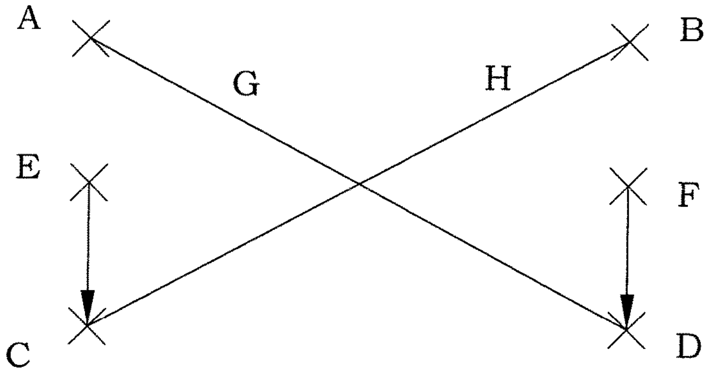
Fig. 2A

TORQUE REACTION ARRANGEMENT FOR PULP WASHERS

TECHNICAL FIELD

The present invention relates in general to arrangements for pulp washers and in particular to torque reaction arrangements for pulp washers.

BACKGROUND

In pulp and paper industry, pulp is washed at different stages in the production line. One common arrangement for washing pulp is a so-called twin press pulp washer. A twin press pulp washer comprises two press rolls, rotating in opposite directions and arranged relative to each other with small press nip. The press rolls are partially submerged into a vessel containing pulp with a high-water content. The surfaces of the press rolls allow for water to pass into the interior of the press rolls, keeping the pulp on the outside. Pulp will follow the rotation of the press rolls through the nip and become partially de-watered.

Each press roll is driven by a roll drive unit, typically comprising a motor and possibly some gear arrangements or other connection members. The press rolls are in many cases very large, with radii exceeding 1 m and lengths exceeding tenth of meters. The press nip is comparatively small, typically in the order of 10-15 mm, and the forces needed to maintain that press nip are therefore high. The roll drive units therefore have to be powerful arrangements giving a considerable torque to the press rolls.

In order for a motor to give torque to a shaft, the stator part of the motor has to be secured in a fundament or other steady parts in order to achieve a reaction force corresponding to the applied rotating torque. At the same time, it has to allow for different press nips. Different torque reaction arrangements are therefore typically provided. A common design is to let the ends of the two torque reaction arms connect at a common connection shaft.

Common for most of these arrangements is that the weight and reaction torque of the roll drive units loads the connection shaft and the roll shaft studs. Since the weight and force of the used roll drive units increases to be able to handle a higher washing rate, the risk for strength failure increases. Furthermore, in

SUMMARY

A general object is to find a design of roll drive units that provides a better control of the loads on the press-rolls to reduce the risk for fatigue failures.

The above object is achieved by methods and devices according to the independent claims. Preferred embodiments are defined in dependent claims.

In general words, in a first aspect, a torque reaction arrangement for twin press-roll pulp washers comprises a first torque reaction arm, a second torque reaction arm, a first link, and a second link. A first end of the first torque reaction arm has mounting means for enabling a rigid mounting to a stator of a first press roll motor with a main extension of the first torque reaction arm being transverse to an extension of a rotational axis of a rotor of the first press roll motor when being rigidly mounted. A first end of the second torque reaction arm has mounting means for enabling a rigid mounting to a stator of a second press roll motor with a main extension of the second torque reaction arm being transverse to an extension of a rotational axis of a rotor of the second press roll motor when being rigidly mounted. The rotational axis of the rotor of the first press roll motor is parallel to the rotational axis of the rotor of the second press roll motor. The first link connects a first connection of the first torque reaction arm and a first connection of the second torque reaction arm. The first connection of the first torque reaction arm and the first connection of the second torque reaction arm allowing a relative turning of the first link relative to the first torque reaction arm and the second torque reaction arm around an axis parallel to the rotational axis of the rotor of the first press roll motor. The second link connects a second connection of the first torque reaction arm and a second connection of the second torque reaction arm. The second connection of the first torque reaction arm and the second connection of the second torque reaction arm allow a relative turning of the second link relative to the first torque reaction arm and the second torque reaction arm around an axis parallel to the rotational axis of the rotor of the second press roll motor. The first connection of the first torque reaction arm is situated at a second end of the first torque reaction arm, opposite to the first end of the first torque reaction arm, and the second connection of the second torque reaction arm is situated at a second end of the second torque reaction arm, opposite to the first end of the second torque reaction arm.

In a second aspect, a twin press-roll pulp washer comprises a first press roll, a first roll drive unit arranged for driving the first press roll, a second press roll, a second roll drive unit arranged for driving the second press roll and a torque reaction arrangement according to the first aspect.

One advantage with the proposed technology is that the reaction forces of the torque reaction arms will at least partly cancel each other. Furthermore, the torque reaction arms will not influence the force of the press nip. Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which:

FIG. 1 illustrates an example of a twin press-roll pulp washer;

FIGS. 2A-B illustrates geometrical considerations concerning torque reaction arms;

DETAILED DESCRIPTION

Figure 2B:
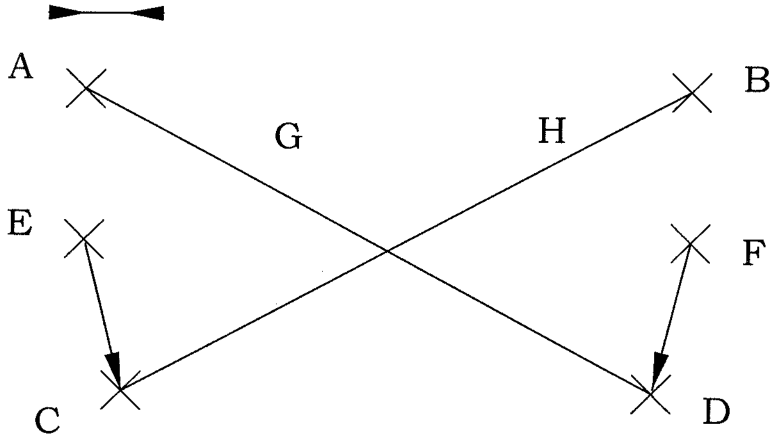

Throughout the drawings, the same reference numbers are used for similar or corresponding elements.

For a better understanding of the proposed technology, it may be useful to begin with a brief overview of torque reaction arrangements used today.

FIG. 1 illustrates schematically an example of a prior art twin press-roll washer 1. The twin press-roll washer 1 comprises a housing 60, in which two press-rolls 51, 52 are rotatably mounted, partly immersed in a vessel 66 comprising pulp to be washed. An inlet 62 for pulp is connected to the vessel 66. The press-rolls 51, 52 are arranged with a press nip 55 between them. A nip pressure adjustment arrangement 61 is arranged between the press-rolls 51, 52 in order to enable adjustments of the distance and force. The surfaces of the press-rolls 51, 52 are perforated, allowing liquids to pass into the interior of the press-rolls 51, 52 for further transportation out from the twin press-roll washer 1. Pulp is settled on the surfaces of the press-rolls 51, 52, preferably by assistance of a pressure difference over the surfaces and the pulp is transported through the press nip 55 in order to further remove the liquids. After passage of the press nip 55, the washed and partly dries pulp is removed from the twin press-roll washer 1 through an outlet arrangement 64. A pulp supplying system 65 is arranged for enable controlling of a rate of pulp entering the twin press-roll pulp washer 1 through the inlet 62. The operation of a twin press-roll washer 1 is well known in prior art and familiar for anyone skilled in the art and will not be discussed in further detail.

In order to drive the press-rolls 51, 52, roll drive units 56, 57 are attached to taps 53, 54 of the press-rolls 51, 52. Motors 58, 59 in the roll drive units 56, 57 are arranged for driving the press-rolls 51, 52 in opposite rotational directions.

A torque reaction arrangement 50 is provided in this example. Each roll drive unit 56, 57 is connected to a respective torque reaction arm 10, 20. In this example, the torque reaction arms 10, 20 are connected via rotational joint 63, assimilating the reaction torques for driving the press-rolls 51, 52 and at the same time allowing the nip pressure adjustment arrangement 61 to adjust the press nip 55. This particular torque reaction arrangement 50 has the disadvantage that the reaction torques are converted into forces on the respective tap 53, 54. These forces have components in the horizontal direction and will therefore, besides the additional load on the taps, influence the conditions at the press nip 55.

According to the ideas presented here, a different geometry is to prefer. FIG. 2A illustrates schematically some geometrical relationships. The crosses A and B correspond to the center of the axis of a respective motor. The lines G and H represent torque reaction arms connected to A and B, respectively. The crosses E and F represent connection points in solid connection with the stator of a respective motor. The crosses C and D represent end connection points at respective torque reaction arms G, H. The reaction torques created in each torque reaction arms G, H are directed downwards in the figure. By connecting the point C and E, and D and F, by a respective link that is rotationally connected at each end point, a part of the force from the torque will load the points E and F, respectively, in a downward direction. Any force components in the horizontal direction will cancel in such a setup.

The geometry still opens up for a flexibility of the relative horizontal positions. In FIG. 2B, the relative distance between the shaft positions of the motors has been shifted according to the double arrow in the top of the figure. Still, the forces actuating on the respective connection points E and F are directed essentially vertically. NOTE, that the shift in the figure is extremely exaggerated compared to the typical shifts of a press nip. All deviations from the vertical direction becomes thus negligible.

This cross-like arrangement of torque reaction arms, extending mainly horizontally, thus gives advantages in force cancellations as well of improved independence between driving torque and press nip forces.

Figure 3:
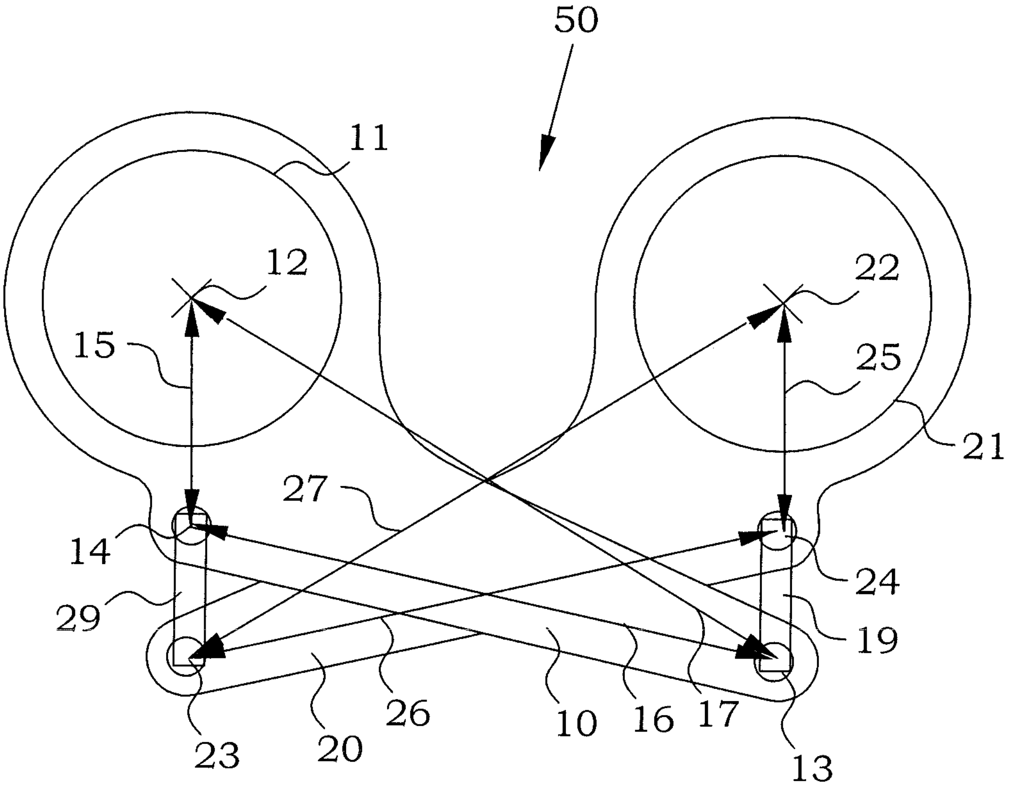
FIG. 3 illustrates schematically an embodiment of a torque reaction arrangement.

A more realistic configuration is illustrated in FIG. 3. A torque reaction arrangement 50 for twin press-roll pulp washers comprises a first torque reaction arm 10 and a second torque reaction arm 20. A first end of the first torque reaction arm 10 has mounting means 11 for enabling a rigid mounting to a stator of a first press roll motor. The mounting is made in such a way that a main extension of the first torque reaction arm 10 is transverse to an extension of a rotational axis 12 of a rotor of the first press roll motor when being rigidly mounted. Likewise, a first end of the second torque reaction arm 20 has mounting means 21 for enabling a rigid mounting to a stator of a second press roll motor. The mounting is made in such a way that a main extension of the second torque reaction arm 20 being transverse to an extension of a rotational axis 22 of a rotor of the second press roll motor when being rigidly mounted. The rotational axis 12 of the rotor of the first press roll motor is parallel to the rotational axis 22 of the rotor of the second press roll motor. Both these axes are directed perpendicular, or at least transverse, to the plane of the paper in FIG. 3.

The mounting means 11 and 21 are typically constituted by a hole in a flange and screw threads for fastening the flange to the stator of the respectively motor. However, as the person skilled in the art understands, the mounting means 11, and 21 can be designed in many other ways as well. The exact configuration of the mounting means 11 and 21 are not of importance for the present technical effect as long as a rigid mounting in the presumed direction is achieved.

The first torque reaction arm 10 as well as the second torque reaction arm 20 have a shape that has a main extension, constituting the "arm". At a far end, relative to the rotor axis 12, of the first torque reaction arm 10, a first connection 13 is provided. The second torque reaction arm 20 has a first connection 24 at a position below and in a vicinity of the mounting means 21. As will be discussed further below, the first connection 24 of the second torque reaction arm 20 is preferably provided straight below the rotational axis 22 of the rotor of the second press roll motor. Also, the first connection 13 of the first torque reaction arm 10 is preferably provided straight below the first connection 24 of the second torque reaction arm 20. A first link 19 connects the first connection 13 of the first torque reaction arm 10 and the first connection 24 of the second torque reaction arm 20. The first connection 13 of the first torque reaction arm 10 and the first connection 24 of the second torque reaction arm 20 are rotational connections, allowing a relative rotation of the first link 19 and the respective torque reaction arm 10, 20. In other words, the first connection 13 of the first torque reaction arm 10 and the first connection 24 of the second torque reaction arm 20 allow a relative turning of the first link 19 relative to the first torque reaction arm 10 and the second torque reaction arm 20 around an axis parallel to the rotational axis 12 of the rotor of the first press roll motor.

Likewise, at a far end, relative to the rotor axis 22, of the second torque reaction arm 20, a connection 23 is provided. The first torque reaction arm 10 has a second connection 14 at a position below and in a vicinity of the mounting means 11. As will be discussed further below, the second connection 14 of the first torque reaction arm 10 is preferably provided straight below the rotational axis 12 of the rotor of the first press roll motor. Also, the second connection 23 of the second torque reaction arm 20 is preferably provided straight below the first connection 14 of the second torque reaction arm 10. A second link 29 connects the second connection 23 of the second torque reaction arm 20 and the second connection 14 of the first torque reaction arm 10. The second connection 23 of the second torque reaction arm 20 and the second connection 14 of the first torque reaction arm 10 are rotational connections, allowing a relative rotation of the second link 29 and the respective torque reaction arm 10, 20. In other words, the second connection 14 of the first torque reaction arm 10 and the second connection 23 of the second torque reaction arm 20 allow a relative turning of the second link 29 relative to the first torque reaction arm 10 and the second torque reaction arm 20 around an axis parallel to the rotational axis 22 of the rotor of the second press roll motor.

The first connection 13 of the first torque reaction arm 10 is thus situated at a second end of the first torque reaction arm 10, opposite to the first end of said first torque reaction arm 10, at which the mounting means 11 is provided. The second connection 23 of the second torque reaction arm 20 is analogously situated at the end of the second torque reaction arm 20, opposite to the first end of the second torque reaction arm 20 at which the mounting means 21 is provided.

As indicated above, it is advantageous if the torque reaction arms are provided as horizontal as possible. This requirement competes with the roll drive units about the space around the rotational axis, and some concessions have to be made. However, it is preferred that the efficient torque reaction arm is longer than the distance to the point where the opposite torque reaction arm connects. This in turn also means that the point where the opposite torque reaction arm connects should be provided closer to the rotational axis than to the endo of the torque reaction arm. In other words, in one embodiment it is preferred if the second connection 14 of the first torque reaction arm 10 is positioned closer to the extension of the rotational axis 12 of the rotor of the first press roll motor than to the first connection 13 of the first torque reaction arm 10. Also, the first connection 24 of the second torque reaction arm 20 is positioned closer to the extension of the rotational axis 22 of the rotor of the second press roll motor than to the second connection 23 of the second torque reaction arm 20.

As also discussed above, it is preferred if the links are provided essentially vertical. This can be designed for by knowing the nominal distance between the two rotational axes of the press rolls, to which the torque reaction arrangement is planned to be applied.

This can also be expressed differently. Preferably, in one embodiment, a direction between the first connection 13 of the first torque reaction arm 10 and the first connection 24 of the second torque reaction arm 20 differs from a direction between the second connection 23 of the second torque reaction arm 20 and the second connection 14 of the first torque reaction arm 10 by less than 15°, preferably less than 10°, more preferably less than 5° and most preferably by 0°.

This may also be expressed as that the angles between the links 19 and 29 should be kept small.

Smaller adjustments of the press nip between the press rolls are typically small compared to the nominal distance between the two rotational axes of the press rolls, which means that the angle between the links 19, 29 is still very small for reasonable adjustments. As an example, if a distance between two press rolls having a radius 0.5 m each is adjusted by 20-30 mm, the change of the angle between the links 19 and 29 becomes practically neglectable.

As also was discussed above, it is preferred if the link direction is aligned with the direction between the connection at the end of the torque reaction arm and the opposite rotational axis. In such a way, no torque can be transferred from one torque reaction arm to the other, but instead just be experiences as a plain force.

In other words, in one embodiment, a direction between the first connection 13 of the first torque reaction arm 10 and the first connection 24 of the second torque reaction arm 20 differs from a direction between the first connection 24 of the second torque reaction arm 20 and the extension of the rotational axis 22 of the rotor of the second press roll motor by less than 15°, preferably less than 10°, more preferably less than 5° and most preferably by 0°. Likewise, a direction between the second connection 23 of the second torque reaction arm 20 and the second connection 14 of the first torque reaction arm 10 differs from a direction between the second connection 14 of the first torque reaction arm 10 and the extension of the rotational axis 12 of the rotor of the first press roll motor by less than 15°, preferably less than 10°, more preferably less than 5° and most preferably by 0°.

In principle, the two different torque reaction arms 10 and 20 could be designed with differing shapes and/or measures. There are no fundamental reasons for not obtaining an operable design using different designs. However, in order to facilitate the design of the entire system, it is preferred if the torque reaction arms are symmetrical, or at least have corresponding main dimensions. In FIG. 3, three dimensions for each torque reaction arm is marked, and these dimensions are preferably the same for the two torque reaction arms. The distances 15 and 25 defines the distance between the rotational axis and the closest connection of a respective torque reaction arm. The distances 16 and 26 defines the distance between the two connections of each respective torque reaction arm. The distances 17 and 27 finally defines the distance between the rotational axis and the most distant connection of a respective torque reaction arm.

In other words, in one embodiment, preferably, a distance 16 between the first 13 and second 14 connections of the first torque reaction arm 10 is equal to a distance 26 between the second 23 and first 24 connections of the second torque reaction arm 20. Furthermore, a distance 17 between the extension of the rotational axis 12 of the rotor of the first press roll motor and the first connection 13 of the first torque reaction arm 10 is equal to a distance 27 between the extension of the rotational axis of the rotor of the second press roll motor and the second connection 23 of the second torque reaction arm 20. Also, a distance 15 between the extension of the rotational axis 12 of the rotor of said first press roll motor and the second connection 14 of the first torque reaction arm 10 is equal to a distance 25 between the extension of the rotational axis 22 of the rotor of the second press roll motor and the first connection 24 of the second torque reaction arm 20.

Figure 4:
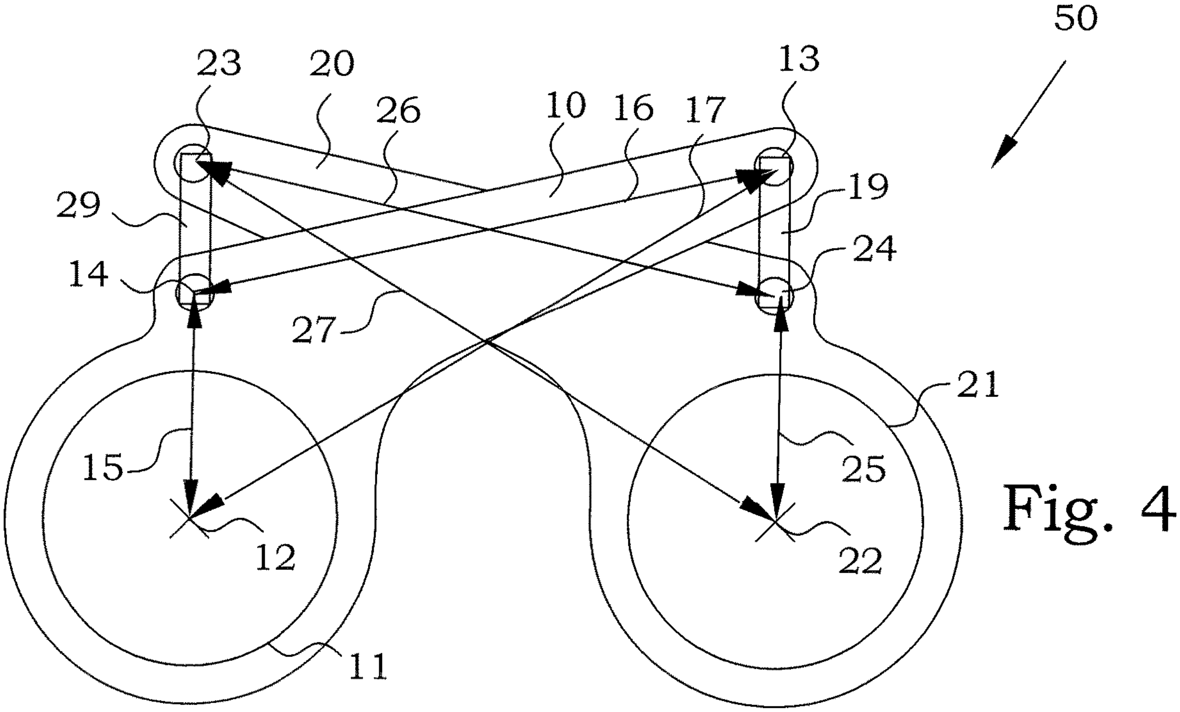
FIG. 4 illustrates schematically another embodiment of a torque reaction arrangement.

The torque reaction arrangements 50 discussed so far have been provided below the plane of the rotational axis of the press rolls. This typically leads to pulling forces in the links 19, 29. However, if the remaining design of the twin press-roll pulp washer so admits or requests, the torque reaction arrangements 50 could equally well be provided above the plane of the rotational axis of the press rolls, as illustrated in FIG. 4. Since the rotational direction of the press rolls is unchanged, such a design will instead lead to pushing forces in the links 19, 29.

The actual design of the torque reaction arms 10, 20 is preferably governed by strength considerations, manufacturing principles and costs. Such considerations are known to a person skilled in the art.

Figure 5:
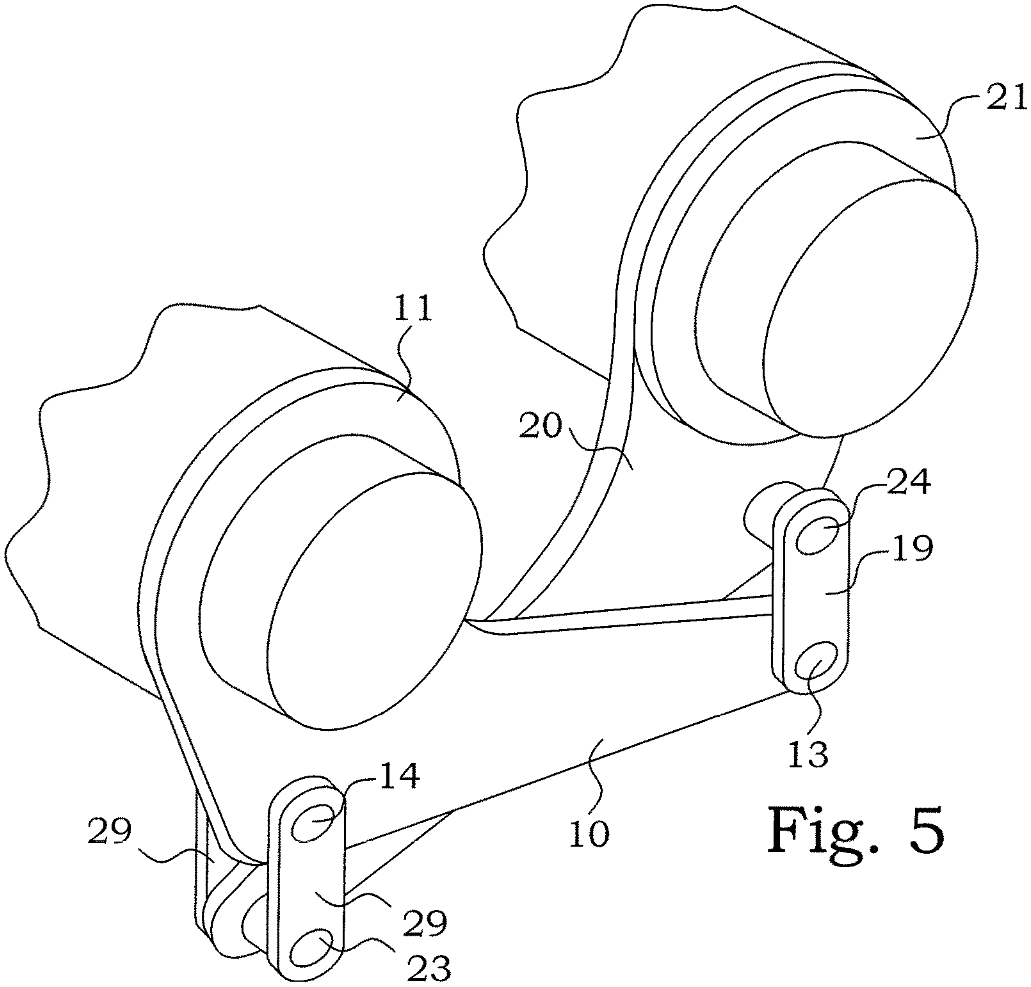
FIG. 5 illustrates an embodiment of links and connections used in a torque reaction arrangement.

One exemplifying embodiment in FIG. 5 illustrates how the torque reaction arrangements 50 may look like, e.g. the nature of the connections. However, this example should not be considered as limiting, since the person skilled in the art is aware of many other detail solutions.

In the particular embodiment of FIG. 5, the links 19, 29 comprises two plates on each side of the torque reaction arms 10, 20. The connections 13, 14, 23, 24 are here constituted by shafts penetrating through the torque reaction arms 10, 20 and the links 19, 29. These shafts are provided with bearings for enabling a relative rotation.

The torque reaction arrangements 50 presented here are by advantage attached to a twin press-roll pulp washer. Due to its simplicity, the torque reaction arrangements 50 can be provided with a new production entity or can be provided as a repair or replacement part in an already operating plant.

Therefore, in one aspect, an embodiment of a twin press-roll pulp washer comprises a first press roll, a first roll drive unit arranged for driving the first press roll, a second press roll and a second roll drive unit arranged for driving the second press roll. The twin press-roll pulp washer further comprises a torque reaction arrangement according to any of the discussed embodiments presented here above.

As described further above, a twin press-roll pulp washer may have the first press roll and the second press roll arranged relative to each other with a press nip. This press nip is one of the process parameters that may be of interest to adjust before or during operation. Therefore, in one embodiment, the twin press-roll pulp washer further comprises nip adjustment means. Since the torque on the press rolls, with use of the above presented torque reaction arrangement do not influence the force between the press rolls, the load of the washer becomes independent on the used torque. This facilitates the control of the press nip. The nip adjustment means may therefore just measure the line load and adapt the press nip without considerations of the applied torque.

In one embodiment, the twin press-roll pulp washer further comprises a pulp supplying system arranged for enable controlling of a rate of pulp entering the twin press-roll pulp washer. This can also be used as a means for controlling the operation and is also facilitated by the fact that the actual applied torque does not influence the press nip.

It is always an advantage to separate the roll torque and line load. In practice, the torque or rotational speed control will probably be similar to what is used in previous arrangements. However, the press nip becomes independent on the torque. This advantage becomes a bonus effect from the solution of reducing the load on the press roll taps. This also opens up for enabling operation at a somewhat higher line load. The load today is limited by the available hydraulic pressure. The pressure is selected with respect to that there is a contribution from the torque reaction arms keeping the press rolls together at the driving side. The pressure is thereby today selected somewhat lower than the theoretical maximum value, approved for the press rolls. Since there is the same pressure on driving and non-driven sides of the press rolls, the load at the non-driven side becomes somewhat lower than the approved load level of the press roll.

In one embodiment of the twin press-roll pulp washer, the first and second roll drive units comprise motor control systems enabling controlling of rotational speed and/or torque transferred to the first and second press rolls. Similarly, as above, since the torque does not affect the press nip, the torque becomes a parameter that can be utilized for control in a much simpler context. Or put differently, the press nip or line load control system can be simplified since they are not influenced by the torque on the press rolls.

In many twin press-roll pulp washers of today, hydraulic motors are comprised in the first and second roll drive units. Typically, the hydraulic motors are supplied by oil from a pump that in turn may be driven by another motor. The present ideas of torque reaction arrangements can by advantage be utilized on such systems.

In many other systems, the first and second roll drive units instead comprise electrical motors, or are to be updated with such electrical motors. A common way to connect the electrical motors to the press roll taps is to use some kind of gears. One embodiment of a twin press-roll pulp washer thus further comprises first and second press roll motors, and first and second gears between said first and second press roll motors and said first and second press rolls, respectively. The present ideas are ideally in such cases where a hydraulic motor is exchanged for an electrical one, since such an updating often causes a large increase of the weight of the roll drive units. The here presented ideas are thereby ideal to compensate for such increased weights.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A torque reaction arrangement for twin press-roll pulp washers, comprising:

a first torque reaction arm;

a second torque reaction arm;

a first link; and a second link; wherein:

a first end of said first torque reaction arm comprises first mounting means for enabling rigid mounting of said first torque reaction arm to a stator of a first press roll motor with a main extension of said first torque reaction arm being transverse to a first extension of a first rotational axis of a rotor of said first press roll motor when being rigidly mounted to said first mounting means;

a first end of said second torque reaction arm comprises second mounting means for enabling a rigid mounting of said second torque reaction arm to a stator of a second press roll motor with a main extension of said second torque reaction arm being transverse to a second extension of a second rotational axis of a rotor of said second press roll motor when being rigidly mounted to said second mounting means, said first rotational axis being parallel to said second rotational axis;

said first link connects a first connection of said first torque reaction arm and a first connection of said second torque reaction arm, and wherein said first connection of said first torque reaction arm and said first connection of said second torque reaction arm allow relative turning of said first link relative to said first torque reaction arm and said second torque reaction arm around an axis parallel to said first rotational axis; and said second link connects a second connection of said first torque reaction arm and a second connection of said second torque reaction arm, and wherein said second connection of said first torque reaction arm and said second connection of said second torque reaction arm allow relative turning of said second link relative to said first torque reaction arm and said second torque reaction arm around an axis parallel to said second rotational axis; and said first connection of said first torque reaction arm is situated at a second end of said first torque reaction arm, opposite to said first end of said first torque reaction arm, and said second connection of said second torque reaction arm is situated at a second end of said second torque reaction arm, opposite to said first end of said second torque reaction arm;

a direction between said first connection of said first torque reaction arm and said first connection of said second torque reaction arm differs from a direction between said second connection of said second torque reaction arm and said second connection of said first torque reaction arm by less than 15°;

a direction between said first connection of said first torque reaction arm and said first connection of said second torque reaction arm differs from a direction between said first connection of said second torque reaction arm and said second extension by less than 15°; and a direction between said second connection of said second torque reaction arm and said second connection of said first torque reaction arm differs from a direction between said second connection of said first torque reaction arm and said first extension by less than 15°.

2. The torque reaction arrangement according to claim 1, wherein:

said second connection of said first torque reaction arm is positioned closer to said first extension than to said first connection of said first torque reaction arm; and said first connection of said second torque reaction arm is positioned closer to said second extension than to said second connection of said second torque reaction arm.

3. The torque reaction arrangement according to claim 1, wherein:

a distance between said first and second connections of said first torque reaction arm is equal to a distance between said first and second connections of said second torque reaction arm;

a distance between said first extension and said first connection of said first torque reaction arm is equal to a distance between said second extension and said second connection of said second torque reaction arm; and a distance between said first extension and said second connection of said first torque reaction arm is equal to a distance between said second extension and said first connection of said second torque reaction arm.

4. A twin press-roll pulp washer comprising:

a torque reaction arrangement according to claim 1;

a first press roll;

a first roll drive unit configured to drive said first press roll, said first drive unit comprising said first press roll motor;

a second press roll; and a second roll drive unit configured to drive said second press roll, said second drive unit comprising said second press roll motor; wherein:

said first and second roll drive units are configured to drive said first and second press rolls in opposite rotational directions; and the torque reaction arrangement is mounted to said stator of said first press roll motor and said stator of said second press roll motor.

5. The twin press-roll pulp washer according to claim 4, wherein:

said first press roll and said second press roll are arranged relative to each other with a press nip; and the twin press-roll pulp washer further comprises nip adjustment means for adjusting said press nip.

6. The twin press-roll pulp washer according to claim 4, further comprising:

a pulp supplying system configured to control a rate of pulp entering said twin press-roll pulp washer.

7. The twin press-roll pulp washer according to claim 4, wherein:

said first and second roll drive units comprise motor control systems configured to control at least one of rotational speed and torque transferred to said first and second press rolls.

8. The twin press-roll pulp washer according to claim 4, wherein:

said first and second roll drive units comprise electrical motors, and wherein said twin press-roll pulp washer further comprises first and second gears between said first and second electrical motors and said first and second press rolls, respectively.

9. The twin press-roll pulp washer according to claim 4, wherein:

said first and second roll drive units comprise hydraulic motors.

10. The torque reaction arrangement according to claim 1, wherein:

said direction between said first connection of said first torque reaction arm and said first connection of said second torque reaction arm differs from said direction between said second connection of said second torque reaction arm and said second connection of said first torque reaction arm by less than 10°;

said direction between said first connection of said first torque reaction arm and said first connection of said second torque reaction arm differs from the direction between said first connection of said second torque reaction arm and said second extension by less than 10°; and said direction between said second connection of said second torque reaction arm and said second connection of said first torque reaction arm differs from said direction between said second connection of said first torque reaction arm and said first extension by less than 10°.

11. The torque reaction arrangement according to claim 1, wherein:

said direction between said first connection of said first torque reaction arm and said first connection of said second torque reaction arm differs from said direction between said second connection of said second torque reaction arm and said second connection of said first torque reaction arm by less than 5°;

said direction between said first connection of said first torque reaction arm and said first connection of said second torque reaction arm differs from said direction between said first connection of said second torque reaction arm and said second extension by less than 5°; and said direction between said second connection of said second torque reaction arm and said second connection of said first torque reaction arm differs from said direction between said second connection of said first torque reaction arm and said first extension by less than 5°.

12. The torque reaction arrangement according to claim 1, wherein:

said direction between said first connection of said first torque reaction arm and said first connection of said second torque reaction arm is parallel to said direction between said second connection of said second torque reaction arm and said second connection of said first torque reaction arm;

said direction between said first connection of said first torque reaction arm and said first connection of said second torque reaction arm is parallel to said direction between said first connection of said second torque reaction arm and said second extension; and said direction between said second connection of said second torque reaction arm and said second connection of said first torque reaction arm is parallel to said direction between said second connection of said first torque reaction arm and said first extension.

* * * * *